US006675653B2

(12) United States Patent
Chen

(10) Patent No.: US 6,675,653 B2
(45) Date of Patent: Jan. 13, 2004

(54) METHOD AND SYSTEM FOR DETECTING DRIVE TRAIN VIBRATIONS

(75) Inventor: Liming Chen, Rochester, MI (US)

(73) Assignee: Robert Bosch Corporation, Broadview, IL (US)

( * ) Notice: Subject to any disclaimer, the term of this patent is extended or adjusted under 35 U.S.C. 154(b) by 96 days.

(21) Appl. No.: 09/932,320

(22) Filed: Aug. 17, 2001

(65) Prior Publication Data

US 2003/0033883 A1 Feb. 20, 2003

(51) Int. Cl.[7] .............................................. G01M 15/00
(52) U.S. Cl. .............................. 73/650; 73/116; 73/660
(58) Field of Search ......................... 73/650, 660, 116; 702/56; 340/683; 701/111

(56) References Cited

U.S. PATENT DOCUMENTS

| 4,667,787 A | | 5/1987 | Hofmann |
| 4,955,449 A | | 9/1990 | Hilburger et al. |
| 5,213,177 A | | 5/1993 | May |
| 5,448,976 A | | 9/1995 | Treinies et al. |
| 5,556,174 A | | 9/1996 | Wiss et al. |
| 5,596,496 A | | 1/1997 | Loeffler |
| 5,727,856 A | | 3/1998 | Kost et al. |
| 5,759,133 A | | 6/1998 | Treinies et al. |
| 5,893,892 A | | 4/1999 | Loeffler |
| 6,050,652 A | | 4/2000 | Kolbe et al. |
| 6,072,297 A | * | 6/2000 | Xu et al. .................... 318/630 |

* cited by examiner

Primary Examiner—John E. Chapman
(74) Attorney, Agent, or Firm—Michael Best & Friedrich LLP

(57) ABSTRACT

A method and system for detecting drive train vibration. The system includes a programmable controller programmed to generate an output signal based on information from a wheel sensor located to sense the rotational behavior of an individual wheel. The controller is programmed to conduct a period test and a pattern test. A vibration of the drive train is detected in the event that both the period test and the pattern test are satisfied.

17 Claims, 2 Drawing Sheets

METHOD AND SYSTEM FOR DETECTING DRIVE TRAIN VIBRATIONS

BACKGROUND OF THE INVENTION

The present invention relates to methods and systems designed to detect vibrations in the drive train of a vehicle. More specifically, the invention relates to detection of drive train vibrations in a vehicle based on an evaluation of the rotational behavior of the wheels of the vehicle.

All mechanical systems (such as bridges, frames, machines, etc.) exhibit a natural frequency. The natural frequency of a body is the frequency at which that body will vibrate due to its own physical characteristics (mass, shape, boundary conditions, etc.) when the body is distorted and released. The drive train of a vehicle is a mechanical system and, therefore, has a natural frequency. As noted, the value of the natural frequency depends on the configuration and boundary conditions of the system. Once the system configuration and the boundary conditions are specified for the system, the natural frequency of the system is fixed. When a drive train is excited at the natural frequency, the drive train vibrates or oscillates in a noticeable manner.

Modern vehicles are usually equipped with one or more advanced control systems, such as anti-lock braking systems (ABS), traction control systems (TCS), electronic skid prevention systems (ESP), driving stability control systems, and the like. Drive train vibrations can severely degrade the performance of these control systems. In a worst case scenario, drive train vibrations may make the vehicle undriveable on a surface that has a low coefficient of friction.

SUMMARY OF THE INVENTION

Accordingly, the invention provides methods and systems designed to detect drive train vibrations of a vehicle. The invention utilizes a period test and a pattern test for detecting the drive train vibrations. A signal is generated based on an evaluation of the rotational behavior of the individual wheels and the torsional vibrations in a circumferential direction of the wheels. The signal includes a vibration signal that is superimposed on a rigid-body motion signal of the wheel. The period of the vibration signal is determined and if the determined period is within the vicinity of the natural frequency of the vehicle drive train, the pattern of the vibration signal is evaluated.

The period test is calibrated using a period calibration parameter or value that is determined by measuring the average value of the vibration signal period during vehicle tests. A vehicle test is typically performed on a representative number of vehicles for each type or model of vehicle. Different types of cars have different system configurations and boundary conditions, and, therefore, have different natural frequencies for their respective vibration signals. The vibration signal period is the inverse of the vibration signal frequency (i.e., the natural frequency of the drive train). Some examples of parameters that affect the natural frequency include: transmission type (automatic or manual transmission), drive train type (front wheel drive, rear wheel drive, or four wheel drive), and the size of components such as the drive shaft and the suspension. The period test is also calibrated to account for variations in the natural frequency of the drive train that may occur over the life of a vehicle as a result of wear and tear of drive train components.

The pattern test is used to ensure that the determined period of the vibration signal is indicative of drive train vibrations and not of some other phenomena such as oscillations caused by vehicle travel over rough surfaces. Without the pattern test, a false positive result or erroneous detection of drive train vibrations could occur.

As is apparent from the above, it is an advantage of the present invention to provide a system and method of detecting vibrations in the drive train of a vehicle. Other features and advantages of the present invention will become apparent by consideration of the detailed description and accompanying drawings.

DETAILED DESCRIPTION

Figure 1:
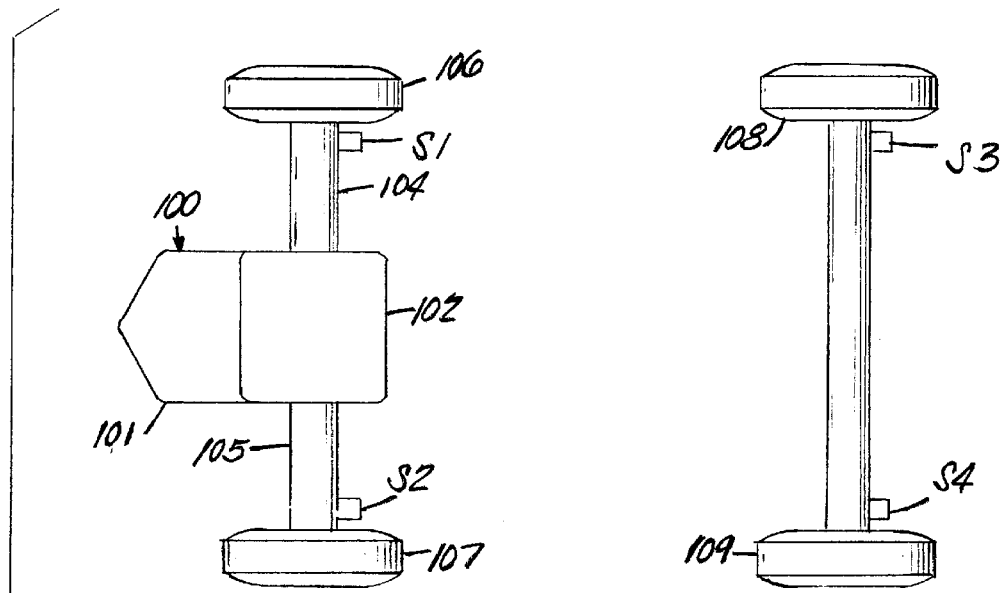
FIG. 1 is a schematic, plan view of a drive train assembly.

Before embodiments of the invention are explained in detail, it is to be understood that the invention is not limited in its application to the details of the construction and the arrangements of the components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

FIG. 1 illustrates a drive train assembly 100. The drive train assembly 100 includes an engine 101 connected to a forward transaxle 102. Power generated by the engine 101 is transferred to two half-shafts 104 and 105 by the forward transaxle 102. The two half-shafts 104 and 105 drive front wheels 106 and 107, respectively. Rear wheels 108 and 109 are not driven. It is to be understood that the invention could be used with any number of commonly known drive train configurations (such as rear-wheel and four-wheel drive) or future configurations.

Figure 2:
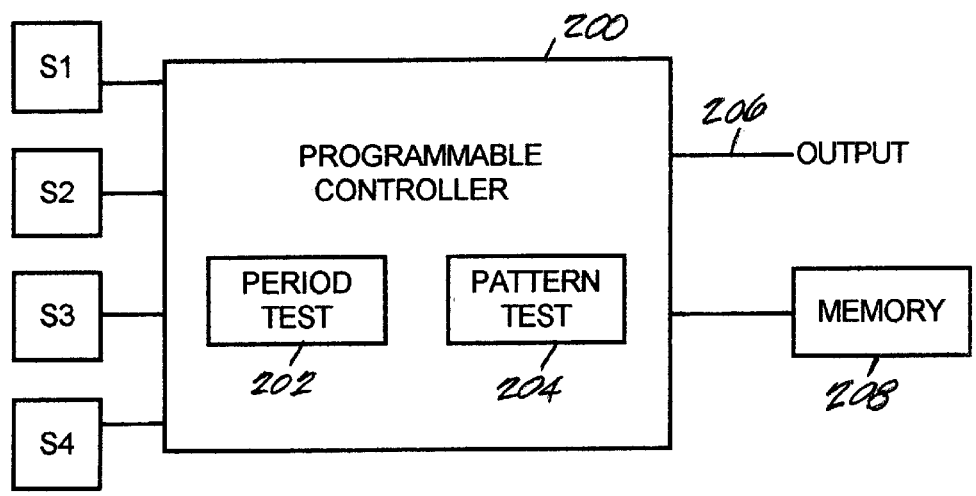
FIG. 2 is a schematic illustration of a controller of one embodiment of the invention.

Data about the rotational behavior of the wheels 106, 107, 108, and 109 is acquired by wheel sensors S1, S2, S3, and S4, respectively. Typically, data about the rotational behavior of the driven wheels is preferred. As shown schematically in FIG. 2, the wheel sensors S1, S2, S3, and S4 are coupled to a programmable controller 200. The controller 200 includes a period test module 202 and a pattern test module 204 (both of which are discussed in greater detail below). The controller 200 has an output pin (or, more broadly, output port) 206 and is coupled to a memory device 208. The controller 200 can be any microprocessor, computer, or other device suitable for receiving data, processing data, storing data (or writing data to a memory device), and generating output signals that are responsive to or based upon the data. The controller 200 can be positioned at any suitable location on the vehicle. The data about the rotational behavior of the individual wheels 106, 107, 108, and 109 is received and processed by the controller 200. The controller 200 performs a period test and a pattern test on the data and outputs a signal that can be used by a system of the vehicle to attenuate the drive train vibrations, such as by modifying the pressure modulation strategy during the ABS, TCS, or ESP events.

Figure 3:
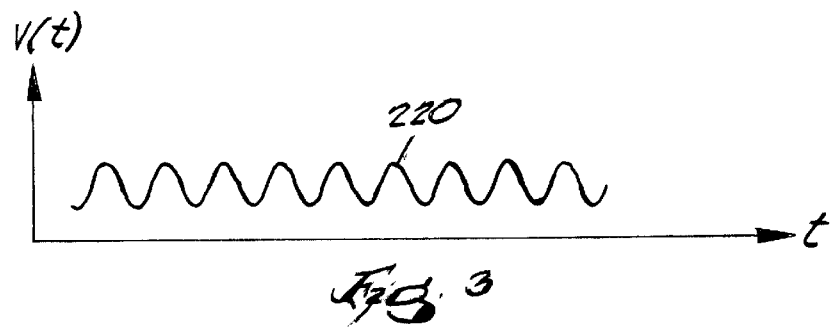
FIG. 3 is a waveform illustrating wheel speed variation resulting from drive train vibrations.

FIG. 3 illustrates an exemplary signal 220 that a wheel speed sensor would sense in a typical real world situation. The signal 220 represents a wheel speed signal with a vibration signal (of unknown origin) superimposed on a rigid-body motion signal of the wheel. The vibration signal could be caused by oscillations of the drive train when excited at the natural frequency or other phenomena.

Figure 4:
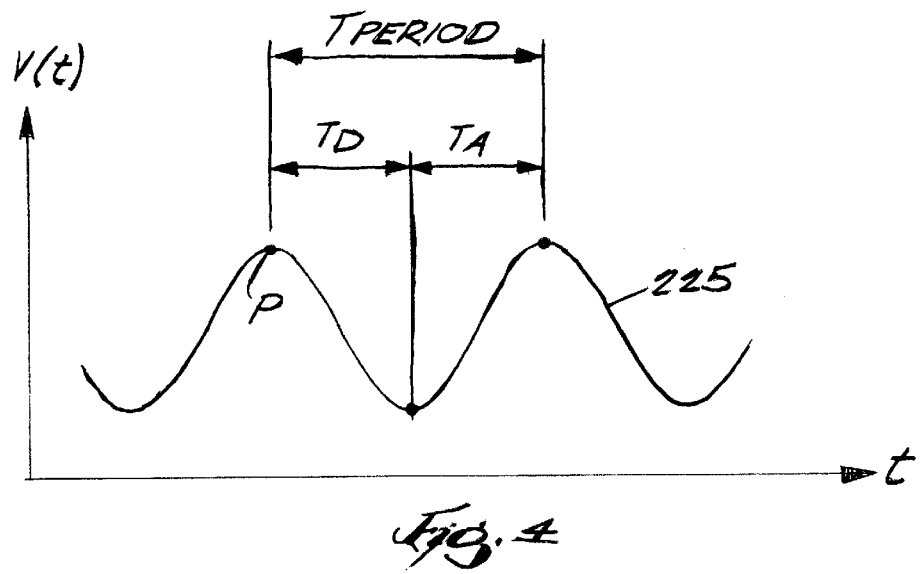
FIG. 4 is a portion of the waveform illustrated in FIG. 3.

FIG. 4 illustrates a vibration signal 225 that represents a wheel speed signal with a vibration signal caused by oscillations of the drive train when excited at its natural frequency superimposed on the rigid-body motion signal of the wheel. As noted, the value of the natural frequency of the vibration signal depends on the system configuration and the boundary conditions of system. The vibration signal component of the wheel speed v(n) is generally a direct result of the wheels 106 and 107 being coupled to the drive train of the vehicle.

The signals such as signals 220 and 225 are analyzed (as discussed further below). The analysis includes measuring or determining a period (sometimes referred to as an "oscillation period") in order to determine whether the signal includes noise caused by drive train vibrations. Broadly speaking, period is used to describe the time interval between two successive occurrences or events. As used herein, period does not necessarily imply that the occurrences or events are successive or repetitive. The period test of the invention determines if the signal of interest is in fact repetitive and thereby includes a period and not merely a time duration between two events.

The period $T_{PERIOD}$ of the vibration signal 225 is fixed due to the natural frequency of the system being fixed. The period $T_{PERIOD}$ of the vibration signal is the sum of the period of the acceleration phase $T_A$ and the period of the deceleration phase $T_D$. Thus, the following relationships are true for the signal 225, $$T_{PERIOD} = \text{Const} \tag{1}$$

and $$T_A = T_D. \tag{2}$$

The transition point from an acceleration-phase to a deceleration-phase of the vibration signal 225 is referred to as a peak P. The transition point from a deceleration-phase to an acceleration-phase of the vibration signal is referred to as a valley V. The values of acceleration at the transition points peak P and valley V are zero. Detection of drive train vibrations involves searching for local maximum (i.e., wheel speed v(n) at peak P) and minimum (i.e., wheel speed v(n) at valley V) wheel speeds and calculating the duration between peak P and valley V points.

Calculation of the period of the acceleration-phase $T_A$ may be accomplished by searching for a maximum wheel speed and recording the time it takes to find that maximum wheel speed. This may be expressed as follows:
if $$v(n) \geq v_{max} \tag{3}$$

then $$v_{max} = v(n) \tag{4}$$

and $$C_A = C_A + 1 \tag{5},$$

where v(n) is the wheel speed sampled at instant n, $v_{max}$ is the maximum wheel speed, and $C_A$ is an acceleration-phase time counter. The process begins when the wheel speed v(n) is at a valley V and ends when the wheel speed v(n) is at a subsequent peak P. The acceleration-phase time counter $C_A$ has a value of zero when the wheel speed v(n) is at the valley V. The acceleration-phase time counter $C_A$ is incremented until a maximum wheel speed $v_{max}$ is located. At this point, the value of the acceleration-phase time counter $C_A$ is representative of the acceleration period $T_A$.

The maximum wheel speed $v_{max}$ is determined by sampling the wheel speed v(n) at a number of sampling instances. When the wheel speed v(n) is at the valley V, the value of the maximum wheel speed $v_{max}$ is initialized to the value of the wheel speed v(0). The wheel speed v(n) is then sampled at n=1, and if the value of the wheel speed v(1) is greater than the value of the maximum wheel speed $v_{max}$, the acceleration-phase time counter $C_A$ is incremented and the value of the maximum wheel speed $v_{max}$ is set to the value of wheel speed v(1). This process of comparing wheel speed v(n) with the value of the maximum wheel speed $v_{max}$ is repeated until the value of wheel speed v(n) is less than the value of the maximum wheel speed $v_{max}$. When the value of wheel speed v(n) is less than the value of the maximum wheel speed $v_{max}$, the wheel speed v(n) has entered a deceleration-phase. At this point, the value of the acceleration phase-time counter $C_A$ and the value of the maximum wheel speed $v_{max}$ are recorded in a memory.

The determination of the period of the deceleration phase $T_D$ is made in a similar fashion and may be accomplished by searching for a minimum wheel speed and recording the time it takes to find that minimum wheel speed. This may be expressed as follows:
if $$v(n) \leq v_{min} \tag{6},$$

then $$v_{min} = v(n) \tag{7}$$

and $$C_D = C_D + 1 \tag{8},$$

where v(n) is the wheel speed sampled at instant n, $v_{min}$ is the minimum wheel speed, and $C_D$ is a deceleration-phase time counter. The process begins when the wheel speed v(n) is at a peak P and ends when the wheel speed v(n) is at the subsequent valley V. The deceleration-phase time counter $C_D$ has a value of zero when the wheel speed v(n) is at the peak P. The deceleration-phase time counter $C_D$ is incremented until a minimum wheel speed $v_{min}$ is located. The minimum wheel speed $v_{min}$ is determined by sampling the wheel speed v(n) at a number of sampling instances. When the wheel speed v(n) is at the peak P, the value of the minimum wheel speed $v_{min}$ is initialized to the value of wheel speed v(0). The wheel speed v(n) is then sampled at n=1, and if the value of the wheel speed v(1) is less than the value of the minimum wheel speed $v_{min}$, the minimum wheel speed $v_{min}$ is set to the value of the wheel speed v(1). This process of comparing wheel speed v(n) with the value of the minimum wheel speed $v_{min}$ is repeated until the value of the wheel speed v(n) is greater than the value of the minimum wheel speed $v_{min}$. When the value of wheel speed v(n) is greater than the value of the minimum wheel speed $v_{min}$, the wheel speed v(n) has entered an acceleration-phase. At this point, the value of the deceleration-phase time counter $C_D$ and the value of the minimum wheel speed $v_{min}$ are recorded in the memory.

Once the peak and valley values of the maximum wheel speed $v_{max}$ and the minimum wheel speed $v_{min}$ are determined, a peak-to-valley difference of wheel speed during the deceleration-phase ($dv_{PTV\_D}$) or a peak-to-valley difference of wheel speed during the acceleration-phase ($dv_{PTV\_A}$) can be calculated, depending or whether acceleration or deceleration is occurring. The peak-to-valley differences are useful in determining vibration severity. The differences are calculated by subtracting the minimum wheel speed $v_{min}$ from the maximum wheel speed $v_{max}$ for the particular acceleration-phase or deceleration-phase. The half peak-to-peak difference of wheel speed for an acceleration-phase $dv_{PTV\_A}$ or a deceleration-phase $dv_{PTV\_D}$ is the amplitude of the vibration signal during that respective phase. These values can also be recorded in memory or output by the controller to the system of the vehicle that regulates the drive train vibrations of the vehicle.

The specific calculation of the peak-to-valley difference and period $T_{PERIOD}$ between two peaks is set out below. When a wheel goes from acceleration at instant n−1 to deceleration at instant n, that is, $$[a(n-1) \geq 0] \& [a(n) < 0], \quad (9)$$

where $$a = \frac{v(n) - v(n-1)}{\Delta t} \quad (10)$$

is the acceleration determined by dividing the difference between the wheel speeds at instant n and n−1 by the calculation interval $\Delta t$, the peak-to-valley difference of wheel speed during acceleration is given by the difference between the maximum wheel speed $v_{max}$ obtained and the minimum wheel speed $v_{min}$ obtained as follows, $$dv_{PTV\_A} = v_{max} - v_{min}. \quad (11)$$

The value of the period $T_{PERIOD}$ of the vibration signal is then obtained by summing the period of the acceleration-phase $T_A$ and the period of the deceleration-phase $T_D$, $$T_{PERIOD} = T_A + T_D. \quad (12)$$

The acceleration-phase time counter $C_A$ is then reset to zero, $$C_A = 0. \quad (13)$$

The controller 200 is utilized to calculate the period $T_{PERIOD}$ of the vibration signal from the values of the period of the acceleration-phase $T_A$ and the period of the deceleration-phase $T_D$. The calculation of the peak-to-valley difference and period $T_{PERIOD}$ between two valleys is carried out in a similar fashion. When a wheel goes from deceleration at instant n−1 to acceleration at instant n, that is, $$[a(n-1) \leq 0] \& [a(n) > 0], \quad (14)$$

where $$a = \frac{v(n) - v(n-1)}{\Delta t} \quad (15)$$

is the acceleration determined by dividing the difference between the wheel speeds at instant n and n−1 by the calculation interval $\Delta t$, the peak-to-valley difference of wheel speed during deceleration is given by the difference between the maximum wheel $v_{max}$ speed obtained and the minimum wheel speed $v_{min}$ obtained, $$dv_{PTV\_D} = v_{max} - v_{min}. \quad (16)$$

The value of the period $T_{PERIOD}$ of the vibration signal is then obtained by summing the period of the acceleration-phase $T_A$ and the period of the deceleration-phase $T_D$, $$T_{PERIOD} = T_A + T_D. \quad (17)$$

The deceleration-phase time counter $C_D$ is then reset to zero, $$C_D = 0. \quad (18)$$

There are three calibration parameters that are used in the process of detecting drive train vibrations: a period calibration parameter, #T_OSC_PER, which corresponds to the period of the natural frequency of the system; a tolerance calibration parameter, #T_OSC_TOL, which corresponds to the variation caused by quantization of the signal and wear and tear on the drive train; and a pattern calibration parameter, #T_OSC_PAT, which corresponds to the time difference between the period of acceleration phase $T_A$ and the period deceleration phase $T_D$.

The period calibration parameter, #T_OSC_PER, is calibrated by measuring the average value of the vibration signal period during vehicle tests. A vehicle test is typically performed on a representative number of vehicles for each type or model of car. (As noted, different types of cars have different natural frequencies). The vibration signal period is the inverse of the vibration signal frequency (i.e., the natural frequency of the drive train).

The tolerance calibration parameter, #T_OSC_TOL, is used to account for the variation of the determined period caused by quantization of the signal, or variation of the determined period $T_{PERIOD}$ that is a result of wear and tear on the drive train over the life of the vehicle. As the components of the drive train wear, the system configuration and the boundary conditions of the system change. As a result, the natural frequency of the drive train changes. The variation of the determined period $T_{PERIOD}$ caused by quantization of the signal can be measured from data obtained during vehicle tests. However, the variation of the determined period $T_{PERIOD}$ that is a result of a change in the natural frequency of the drive train is unavailable at the time of calibration. In order to properly determine an appropriate value for the tolerance calibration parameter, #T_OSC_TOL, a value based on the quantization error plus an additional amount that is an educated estimate of the amount of component variation and deterioration is calculated. Subsequent testing of vehicles and components may assist in making the educated estimate more accurate for future instantiations of the tolerance calibration parameter, #T_OSC_TOL.

The pattern calibration parameter, #T_OSC_PAT, is calibrated to a value, which is greater than or equal to the maximum difference between the period of the acceleration phase $T_A$ and the period of the deceleration phase $T_D$ measured during vehicle tests. The pattern calibration parameter, #T_OSC_PAT, is used to account for the variation of the determined period $T_{PERIOD}$ caused by quantization of the signal. Variation of the determined period $T_{PERIOD}$ that is a result of wear and tear on the drive train over the life of the vehicle does not affect the calibration of the pattern parameter as it affects the tolerance calibration parameter, #T_OSC_TOL.

A drive train oscillation is considered to exist when results of the period test and the pattern test for a particular period of the waveform are both positive. This is set forth in the Boolean expression below, $$[|T_{PERIOD} - \#T\_OSC\_PER| \leq \#T\_OSC\_TOL] \& [|T_A - T_D| \leq \#T\_OSC\_PAT] \quad (19)$$

The first half (to the left of the & sign) of the expression (19) constitutes a period test and the second half (to the right of the & sign) of the expression (19) constitutes a pattern test.

To perform the period test, the controller 200 determines if the absolute value of the difference between the determined period $T_{PERIOD}$ and the period calibration parameter #T_OSC_PER is less than or equal to the tolerance calibration parameter #T_OSC_TOL. The absolute value of the difference is less than or equal to the tolerance calibration parameter #T_OSC_TOL when the determined period $T_{PERIOD}$ is in the range between and including (#T_OSC_PER−#T_OSC_TOL) and (#T_OSC_PER+#T_OSC_TOL). If the determined period $T_{PERIOD}$ is not within this range, the period test fails and the controller 200 evaluates the next period of the waveform. If the determined period $T_{PERIOD}$ is within this range, the controller 200 performs the pattern test. For most cars, the period of the drive train vibrating at its natural frequency is between 0.08 and 0.2 seconds (i.e., generally, the natural frequency of the drive train systems of vehicles is between 5 Hz and 13 Hz).

To perform the pattern test, the controller 200 determines if the absolute value of the difference between the period of the acceleration phase $T_A$ and the period of the deceleration phase $T_D$ is less than or equal to the pattern calibration parameter #T_OSC_PAT. The absolute value of the difference is less than or equal to the pattern calibration parameter #T_OSC_PAT when the period of the acceleration phase $T_A$ and the period of the deceleration phase $T_D$ are separated by less than or the same amount of the variation caused by quantization of the signal. If the difference is less than or equal to the pattern calibration parameter #T_OSC_PAT, the pattern test passes. Otherwise, the pattern test fails and the controller 200 evaluates the next period of the waveform.

The pattern test is very important in determining vibrations caused by the drive train because the determined period $T_{PERIOD}$ between two successive peaks or valleys of some non-vibrating wheel behavior may fall within the range between and including (#T_OSC_PER−#T_OSC_TOL) and (#T_OSC_PER+#T_OSC_TOL), thereby passing the period test, but it may still fail the pattern test if the wheel behavior is not generated by the drive train vibrations.

Figure 5:
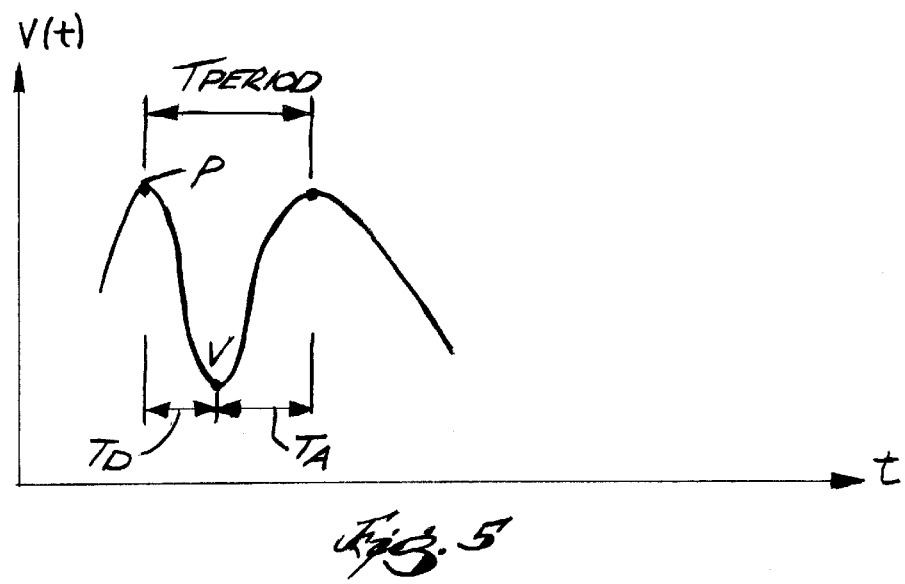
FIG. 5 is a waveform illustrating wheel speed variation cause by non-drive-train vibrations.

Two representative examples of wheel speed v(n) waveforms are illustrated in FIG. 4 and FIG. 5. The waveform illustrated in FIG. 4 passes both the period test and the pattern test. The determined period $T_{PERIOD}$ is within the acceptable range, therefore the pattern test is passed, and the period of the acceleration phase $T_A$ and the period of the deceleration phase $T_D$ are equal, therefore, the pattern test is passed. The waveform in FIG. 5 passes the period test but not the pattern test. The difference between the period of the acceleration phase $T_A$ and the period of the deceleration phase $T_D$ is not less than or equal to the pattern calibration parameter #T_OSC_PAT. The variation in the wheel speed v(n) waveform is therefore likely caused by some event other than drive train vibration. The wheel speed v(n) behavior illustrated is likely caused by non-drive train oscillations.

The controller 200 detects drive train vibrations as soon as one full vibration cycle is completed. The evaluation of the wheel speed v(n) to detect drive train vibrations is, therefore, very robust and useful to reduce degradation of control system operation.

As can be seen from the above, the invention provides a method and system of detecting drive train vibration in a vehicle.

Various features and advantages of the invention are set forth in the following claims.

What is claimed is:

1. A method of detecting drive train vibrations, the method comprising:

determining a wheel oscillation period;

generating a value when an absolute difference between the wheel oscillation period and a period calibration parameter is less than or equal to a first tolerance;

determining a wheel acceleration phase;

determining a deceleration phase using the wheel acceleration phase;

generating a second value when a second absolute difference between the wheel acceleration phase and the deceleration phase is less than or equal to a second tolerance; and indicating a drive train vibration once the first value and the second value are generated.

2. The method as claimed in claim 1, wherein the first tolerance is based upon a tolerance calibration parameter.

3. The method as claimed in claim 1, wherein the acceleration phase comprises a peak, and wherein determining the deceleration phase using the wheel acceleration phase, further comprises:

recording a time corresponding to the wheel acceleration phase peak; and detecting a deceleration phase with the recorded time.

4. The method as claimed in claim 1, wherein the wheel oscillation-period comprises a sum of an acceleration time and a deceleration time.

5. The method as claimed in claim 1, wherein the second tolerance comprises a pattern calibration parameter.

6. A method of detecting drive train vibrations, the method comprising:

determining an absolute difference between an oscillation period and a period calibration parameter;

comparing the absolute difference and a tolerance calibration parameter;

determining a second absolute difference between an acceleration time and a deceleration time;

comparing the second absolute difference and a pattern calibration parameter; and indicating a drive train vibration when the absolute difference is less than or equal to the tolerance calibration parameter and when the second absolute difference is less than or equal to the pattern calibration parameter.

7. The method as claimed in claim 6, wherein determining a second absolute difference between the acceleration time and the deceleration time further comprises:

determining an acceleration phase thereby generating an acceleration time, the acceleration phase having a peak; and determining a deceleration time starting with the peak of the acceleration phase.

8. A system for detecting drive train vibrations of a vehicle, the vehicle having a drive train and at least one wheel, the system comprising:

a wheel sensor operable to sense a rotational behavior of the wheel; and a programmable controller operable to be coupled to the wheel sensor, the controller generating an absolute difference between an oscillation period and a period calibration parameter, generating a second absolute difference between an acceleration time and a deceleration time, and indicating a drive train vibration when the absolute difference is less than or equal to a tolerance calibration parameter and when the second absolute difference is less than or equal to a pattern calibration parameter.

9. The system of claim 8 wherein the oscillation period comprises a sum of an acceleration time and a deceleration time.

10. A vehicle comprising:

a drive train;

a plurality of wheels;

a wheel sensor associated with each wheel; and a controller coupled to each wheel sensor, the controller generating an absolute difference between an oscillation period and a period calibration parameter, generating a second absolute difference between an acceleration time and an deceleration time, and indicating a drive train vibration when the absolute difference is less than or equal to a tolerance calibration parameter and when the second absolute difference is less than or equal to a pattern calibration parameter.

11. The vehicle as claimed in 10, wherein the oscillation period comprises a sum of an acceleration time and a deceleration time.

12. A method of detecting a vibration, the method comprising:

sensing wheel data at a sensor operative to be coupled to a processor;

determining a first maximum in the data;

determining a first minimum in the data using the first maximum;

determining a first time difference between the first maximum and the first minimum;

determining a second maximum;

determining a second time difference between the first minimun and the second maximum;

retrieving a tolerance calibration parameter from the processor;

determining a sum of the first time difference and the second time difference;

generating a period value when the sum is less than or equal to the tolerance calibration parameter;

retrieving a pattern calibration parameter from the processor;

determining an absolute difference between the first time difference and the second time difference;

generating a pattern value when the absolute difference is less than or equal to the pattern calibration parameter; and indicating a drive train vibration once the period value and the pattern value are generated.

13. A method of detecting drive train vibrations, the method comprising:

determining an acceleration phase, the acceleration phase having a peak;

determining a deceleration phase starting with the acceleration phase peak;

comparing the acceleration phase with the deceleration phase;

summing the acceleration phase, the deceleration phase, and a period parameter; and indicating a drive train vibration when the sum is less than or equal to a first tolerance and the comparison is less than or equal to a second tolerance.

14. The method of claim 13, and wherein comparing the acceleration phase with the deceleration phase further comprises determining an absolute difference between the acceleration phase and the deceleration phase.

15. The method of claim 13, and wherein summing the acceleration phase, the deceleration phase, and the period parameter further comprises determining an absolute difference between a sum of the acceleration phase and the deceleration phase, and the period parameter.

16. The method of claim 13, and wherein the first tolerance comprises a tolerance calibration parameter.

17. The method of claim 13, and wherein the second tolerance comprises a pattern calibration parameter.

* * * * *